US007461403B1

(12) United States Patent
Libenzi et al.

(10) Patent No.: US 7,461,403 B1
(45) Date of Patent: Dec. 2, 2008

(54) SYSTEM AND METHOD FOR PROVIDING PASSIVE SCREENING OF TRANSIENT MESSAGES IN A DISTRIBUTED COMPUTING ENVIRONMENT

(75) Inventors: Davide Libenzi, Hillsboro, OR (US); Victor Kouznetsov, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 1269 days.

(21) Appl. No.: 10/061,415

(22) Filed: Feb. 1, 2002

Related U.S. Application Data

(60) Provisional application No. 60/309,858, filed on Aug. 3, 2001, provisional application No. 60/309,835, filed on Aug. 3, 2001.

(51) Int. Cl.
*G06F 17/00* (2006.01)
*G06F 15/16* (2006.01)
*H04L 9/00* (2006.01)
*G06F 11/30* (2006.01)

(52) U.S. Cl. ........................... 726/24; 726/13; 713/151; 713/154; 713/188; 709/224; 709/231; 709/232

(58) Field of Classification Search ................. 713/201, 713/151, 154, 188; 709/224, 231, 232; 726/24, 726/13
See application file for complete search history.

(56) References Cited

U.S. PATENT DOCUMENTS 5,787,253 A * 7/1998 McCreery et al. ........... 709/231
5,889,943 A * 3/1999 Ji et al. ....................... 713/201
5,968,176 A 10/1999 Nessett et al. ............... 713/201
6,088,803 A * 7/2000 Tso et al. .................... 713/201
6,272,641 B1 * 8/2001 Ji .............................. 713/201
6,275,937 B1 * 8/2001 Hailpern et al. ............. 713/188
6,381,242 B1 * 4/2002 Maher et al. ................ 370/394
6,453,345 B2 * 9/2002 Trcka et al. ................. 709/224
6,487,666 B1 * 11/2002 Shanklin et al. ............. 713/201
6,513,122 B1 * 1/2003 Magdych et al. ............ 713/201
6,684,329 B1 * 1/2004 Epstein et al. .............. 713/150
6,748,534 B1 * 6/2004 Gryaznov et al. ........... 713/188
6,781,992 B1 * 8/2004 Rana et al. .................. 370/394
6,785,732 B1 * 8/2004 Bates et al. ................. 709/232
7,047,423 B1 * 5/2006 Maloney et al. ................ 726/2

(Continued)

FOREIGN PATENT DOCUMENTS

EP 1081894 A1 3/2001

OTHER PUBLICATIONS

Microsoft Computer Dictionary Fifth Edition, Mircosoft Press, 2002, pp. 143.*

(Continued)

*Primary Examiner*—Ayaz Sheikh
*Assistant Examiner*—Matthew T Henning
(74) *Attorney, Agent, or Firm*—Zilka-Kotab, PC

(57) ABSTRACT

A system and method includes passive screening of transient messages in a distributed computing environment. A transient packet stream is passively monitored at a network boundary. Incoming datagrams structured in compliance with a network protocol layer are received. One or more of the incoming datagrams are reassembled into a segment structured in compliance with a transport protocol layer. Contents of the reassembled segment are scanned for a presence of at least one of a computer virus and malware to identify infected message contents.

49 Claims, 11 Drawing Sheets

U.S. PATENT DOCUMENTS

| | | | | |
|---|---|---|---|---|
| 7,054,930 | B1 * | 5/2006 | Cheriton | 709/226 |
| 7,197,762 | B2 * | 3/2007 | Tarquini | 726/3 |
| 7,346,928 | B1 * | 3/2008 | Muhlestein | 726/24 |
| 7,360,245 | B1 * | 4/2008 | Ramachandran et al. | 726/13 |
| 7,389,540 | B2 * | 6/2008 | Radatti et al. | 726/24 |
| 2004/0117478 | A1 * | 6/2004 | Triulzi et al. | 709/224 |

OTHER PUBLICATIONS

Stevens, Richard W. "TCP/IP Illustrated, vol. 1" 1994, Addison Wesley, pp. 148.*

"Virus Information Library," http://vi.mcafee.com; Networks Associates, Inc., 2001.

Stephens W R, "SMTP: Simple Mail Transfer Protocol," *TCP/IP Illustrated: The Protocols*; vol. 1, Ch. 1-3, 28, pp. 1-51 and 441-459, 1999, Addison-Wesley, USA.

"AVP AntiViral Toolkit Pro," Central Command Inc., Medina, Ohio.

Search Report from PCT application No. US02/23827 which was mailed Mar. 28, 2003.

* cited by examiner

50

70
73
76
HTTP Packet
77
FTP File
78
SMTP Message
79
NNTP Article
80
Gnutella File
72
75
TCP Segment
71
74
IP Datagram

90

150
Correlate events
151
Do While TRUE
152
Retrieve packet from queue
153
Compare to logged events
154
Pattern?
Yes
155
Generate warning
No
156
Enqueue packet back on queue
157
End Do
Return

SYSTEM AND METHOD FOR PROVIDING PASSIVE SCREENING OF TRANSIENT MESSAGES IN A DISTRIBUTED COMPUTING ENVIRONMENT

CROSS-REFERENCE TO RELATED APPLICATIONS

This patent application is a conversion of U.S. provisional patent applications, Ser. No. 60/309,835, filed Aug. 3, 2001, and Ser. No. 60/309,858, filed Aug. 3, 2001, the priority dates of which are claimed and the disclosures of which are incorporated by reference.

FIELD OF THE INVENTION

The present invention relates in general to passive message screening and, in particular, to a system and method for providing passive screening of transient messages in a distributed computing environment.

BACKGROUND OF THE INVENTION

Computer viruses, or simply "viruses," are executable programs or procedures, often masquerading as legitimate files, messages or attachments that cause malicious and sometimes destructive results. More precisely, computer viruses include any form of self-replicating computer code which can be stored, disseminated, and directly or indirectly executed by unsuspecting clients. Viruses travel between machines over network connections or via infected media and can be executable code disguised as application programs, functions, macros, electronic mail, (email) attachments, images, applets, and even hypertext links.

The earliest computer viruses infected boot sectors and files. Over time, computer viruses became increasingly sophisticated and diversified into various genre, including cavity, cluster, companion, direct action, encrypting, multipartite, mutating, polymorphic, overwriting, self-garbling, and stealth viruses, such as described in "Virus Information Library, ", Networks Associates Technology, Inc., (2001), the disclosure of which is incorporated by reference. Macro viruses are presently the most popular form of virus. These viruses are written as scripts in macro programming languages, which are often included with email as innocuous-looking attachments.

The problems presented by computer viruses, malware, and other forms of bad content are multiplied within a bounded network domain interfacing to external internetworks through a limited-bandwidth service portal, such as a gateway, bridge or similar routing device. The routing device logically forms a protected enclave within which clients and servers exchange data, including email and other content. All data originating from or being sent to systems outside the network domain must pass through the routing device. Maintaining high throughput at the routing device is paramount to optimal network performance.

Routing devices provide an efficient solution to interfacing an intranetwork of clients and servers to external internetworks. Most routing devices operate as store-and-forward packet routing devices, which can process a high volume of traffic transiting across the network domain boundary. Duplicate messages, however, introduce inefficiencies and can potentially degrade performance. For example, a message can be sent with multiple recipients who each receive a separate copy. Nevertheless, the routing device must process each duplicate message as if the message were unique.

A firewall can be used with a routing device to provide limited security. The firewall filters incoming packets to deny access by unauthorized users. Thus, the firewall can protect indirectly against the introduction of computer viruses and other malware into a network domain. As each duplicate message must still be scanned prior to delivery, a firewall does not relieve packet congestion at a network boundary and can actually degrade throughput by delaying delivery.

The bottleneck created by the routing device and firewall create a security risk that can be exploited in a denial of service (DoS) attack. The "ILOVEYOU" virus, released in May 2000, dramatically demonstrated the vulnerability of network infrastructure components by propagating copies of emails containing the virus using addresses obtained from a user address book on each client system. Each email message contained identical content but listed a different recipient. The resultant email flood saturated servers with massively duplicated copies of substantially the same email and denied service through resource depletion and network bandwidth consumption.

Most firewalls failed to detect the presence of the "ILOVEYOU" virus. Firewalls require a priori knowledge of network addresses corresponding to proscribed servers to effectively filter out potentially bad packets. Therefore, infected emails were delivered and unwittingly opened by unsuspecting users, creating a flood of infected message traffic.

Active packet scanners can be used in lieu of or in addition to firewalls to dynamically analyze an incoming packet stream at a network domain boundary. Each packet is intercepted and analyzed while in transit into a protected enclave. However, active scanners can adversely affect the timing of packet delivery. Detecting computer viruses, malware and other bad content embedded in upper layer network protocols, in particular, at the transport and application layers, requires the analysis of a stream of lower layer packets collectively comprising upper layer messages. Interrupting the flow of the packet stream, though, can cause the recipient client to timeout and erroneously generate a retransmission request, thereby hindering throughput. As well, active scanners are installed at the gateway and require administrator-level permissions and privileges and create further potential security risks.

Therefore, there is a need for an approach to passively screening a multiplicity of substantially duplicate message packets transiting the boundary of a network domain. Preferably, such an approach would detect protocol-specific computer viruses, malware and other bad content without causing an interruption of an incoming data packet stream.

There is a further need for an approach to identifying patterns in a transient packet stream for events indicative of a network service or similar type of attach, preferably in combination with the detection of computer viruses, malware and other bad content.

SUMMARY OF THE INVENTION

The present invention provides a system and method for passively detecting computer viruses, malware, and bad content in transient packets and denial of service and related network attacks. Incoming network packets are passively copied from a packet stream into an incoming message queue. The network packets in the stream are reassembled into and identified as upper layer network protocol packets. Each reassembled packet is scanned by a network protocol-specific scanner to identify computer viruses, malware, and other bad content. Concurrently, the reassembled packets are analyzed as a packet stream to identify a denial of service or related type of network attack. By passively processing the incoming packet stream, each packet can be examined for potential security without affecting network throughput.

An embodiment provides a system and a method for providing passive screening of transient messages in a distributed computing environment. A transient packet stream is passively monitored at a network boundary. Incoming datagrams structured in compliance with a network protocol layer are received. One or more of the incoming datagrams are reassembled into a segment structured in compliance with a transport protocol layer. Contents of the reassembled segment are scanned for a presence of at least one of a computer virus and malware to identify infected message contents.

A further embodiment provides a system and method for passively detecting computer viruses and malware and denial of service-type network attacks in a distributed computing environment. Copies of datagrams transiting a boundary of a network domain are received into an incoming packet queue. Each datagram is copied from a packet stream. One or more such datagrams from the incoming packet queue are reassembled into network protocol packets. Each network protocol packet is staged in a reassembled packet queue. Each network protocol packet from the reassembled packet queue is scanned to ascertain an infection of at least one of a computer virus and malware. Events identified from the datagrams in the packet stream are evaluated to detect a denial of service-type network attack on the network domain.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustive in nature and not as restrictive.

DETAILED DESCRIPTION

Figure 1:
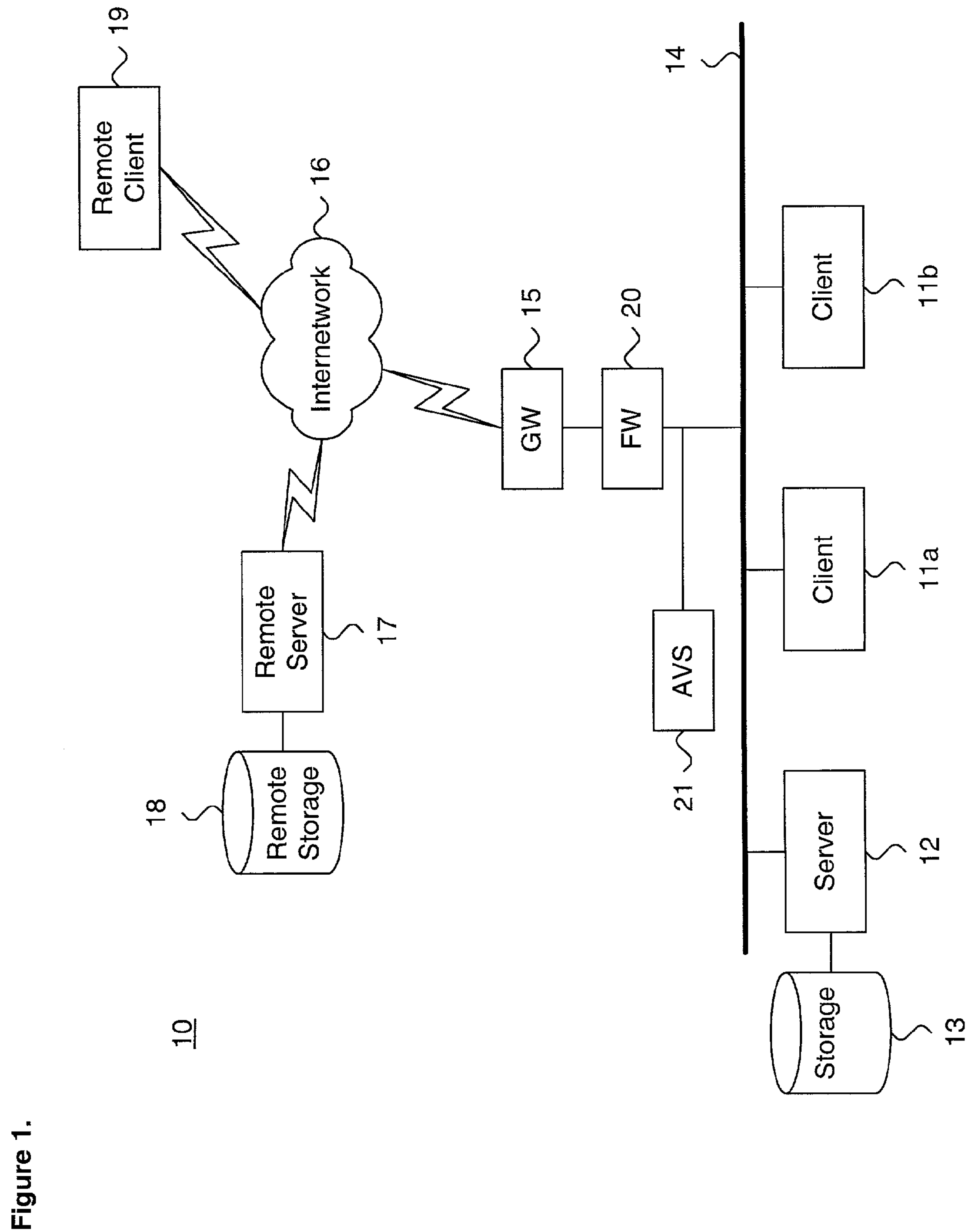
FIG. 1 is a block diagram showing a system for providing passive screening of transient messages in a distributed computing environment, in accordance with the present invention.

FIG. 1 is a block diagram showing a system for providing passive screening of transient messages in a distributed computing environment 10, in accordance with the present invention. By way of example, a gateway 15 (or bridge, router, or similar packet routing device) interfaces an intranetwork 14 to an internetwork 16, including the Internet. The intranetwork 14 interconnects one or more servers 12 with one or more clients 11*a-b* within a bounded network domain defined by a common network address space. The server 12 includes a storage device 13 for common file storage and sharing. The clients 11*a-b* can also include storage devices (not shown).

The individual servers 12 and clients 11*a-b* externally connect to one or more remote servers 17 and remote clients 19 over the internetwork 16 via the gateway 15. The gateway 15 operates as a store-and-forward packet routing device, which processes a high volume of packet traffic transiting across the network domain boundary. The gateway 15 provides an efficient solution to interfacing the individual servers 12 and clients 11*a-b* to external systems operating over the internetwork 16. Optionally, a firewall 20 can provide limited security to the intranetwork 14 by providing filtering of packets originating from unauthorized users. Other network topologies and configurations are feasible, as would be recognized by one skilled in the art.

In addition to the firewall 20, an antivirus system (AVS) 21 passively analyzes message packets incoming to the bounded network domain for the presence of computer viruses, malware, and other bad content, and provides passive screening of a transient packet stream, as further described below with reference to FIG. 2. Each component in the distributed computing environment 10 executes a layered network protocol stack for processing different types of packets, including packets compliant with the Internet Protocol (IP) and Transmission Control Protocol (TCP).

The individual computer systems, including servers 12, 17 and clients 11*a-b*, 19 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
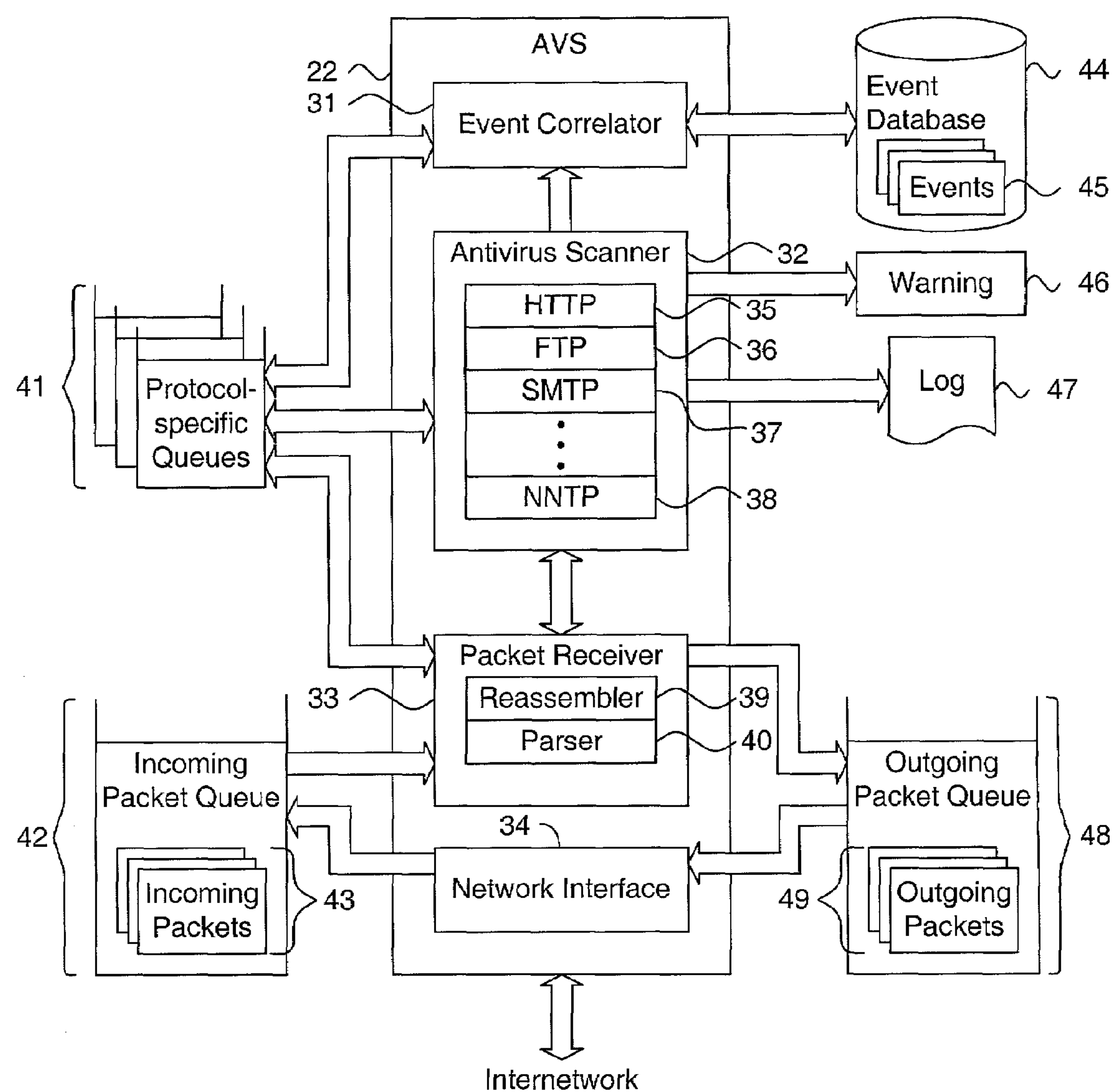
FIG. 2 is a functional block diagram showing the software modules of the antivirus system of FIG. 1.

FIG. 2 is a functional block diagram showing the software modules 30 of the antivirus system 21 of FIG. 1. The antivirus system 21 includes three functionally separate modules: event correlator 31, antivirus scanner 32, packet receiver 33, and network interface 34. The network interface 34 operates in a promiscuous mode to copy each incoming packet 43 into an incoming packet queue 42. The transient message packets are preferably exchanged in compliance with the SMTP protocol, such as described in W. R. Stevens, "TCP/IP illustrated, Vol. 1, the Protocols," Ch. 28, Addison Wesley Longman, Inc. (1994), the disclosure of which is incorporated by reference.

The packet receiver 33, antivirus scanner 32, and event controller 31 are functionally separate modules. The packet receiver 33 retrieves the incoming packets 43 from the incoming packet queue 42. The packet receiver 33 operates at a network protocol layer. In the described embodiment, only packets compliant with the IP protocol are processed. The incoming packets 43 are reassembled by a reassembler submodule 39 into TCP protocol layer segments which are then parsed by a parser 40 to identify the specific upper layer protocol employed. The reassembled packets are staged in protocol-specific queues 41, as further described below with reference to FIG. 3.

The antivirus scanner 32 includes a plurality of protocol-specific scanning submodules 35-38, including submodules for the Hypertext Protocol (HTTP), File Transfer Protocol (FTP), Simple Mail Transport Protocol (SMTP), and Network News Transport Protocol (NNTP), although other upper layer network protocols could also be implemented, as would be recognized by one skilled in the art.

Through each protocol-specific module 35-38, the antivirus scanner 32 retrieves each re-assembled packet from the appropriate protocol-specific queue 41 for scanning using standard antivirus techniques, as are known in the art. Upon detecting the presence of an infected message, the antivirus scanner 32 logs the occurrence in a log 47. In addition, the antivirus scanner 32 can optionally generate a warning 46 to the network administrator or other appropriate user. As well, the antivirus scanner 32 can optionally "spoof" the origin server by sending a legitimate packet in place of the infected packet. The legitimate packet is placed as an outgoing packet 49 in the outgoing packet queue 48 for sending over the internetwork via the network interface 34.

The antivirus scanner 32 operates in an event-based manner by processing reassembled packets in the appropriate protocol-specific queue 41. The protocol-specific queues 41 function as event-handlers by creating logical connections between the packet receiver 33 and the antivirus scanner 32. Protocol-specific queues 41 provide an intermediate store in which reassembled packets are staged based on the upper layer protocol employed.

The antivirus scanner 32 can fall behind in processing if the protocol-specific queues 41 become saturated with reassembled packets. As the packet receiver 33 can process transient messages at a higher rate than the antivirus scanner 32, the packet receiver 33 maintains the protocol-specific queues 41 at a constant size in pace with the antivirus scanner 32 and prevents protocol-specific queues 41 from becoming saturated by reassembled packets awaiting scanning.

The event correlator 31 optionally provides a meta computer virus screening functionality to the antivirus system 21. The event correlator 31 analyzes the reassembled packets in the protocol-specific queues 41 to identify patterns in the incoming packet stream indicative of a network service attack or other type of network event. Upon detecting an event of interest, the event correlator 31 stores each vent 45 in an event database 44.

Each module, including network interface 34, packet receiver 33, antivirus scanner 32, and event correlator 31 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The modules operates in accordance with a sequence of process steps, as further described below with reference to FIG. 6.

Figure 3:
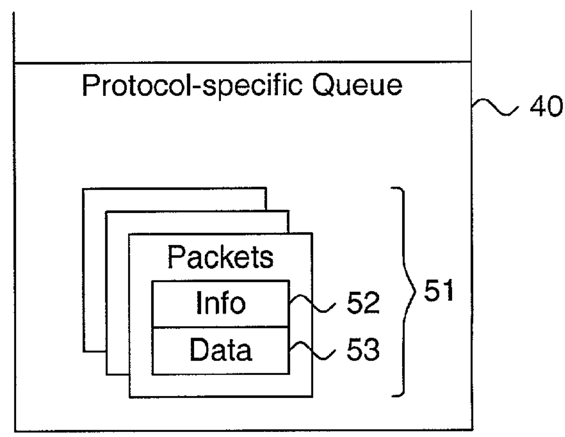
FIG. 3 is a functional block diagram showing the protocol-specific message queue of the antivirus system of FIG. 2.

FIG. 3 is a functional block diagram showing the protocol-specific message queue 40 of the anti-virus system 21 of FIG. 2. For efficiency, the protocol-specific queue 40 categorizes the individual reassembled packets according to the upper-layer network protocol employed. The anti-virus system 21 supports one protocol-specific queue per upper-layer protocol, although other logical combinations and separations of protocol-specific queues are possible.

Each reassembled packet 51 staged in a protocol-specific queue 40 includes two types of information. First, protocol-dependent information 52 is stored with each reassembled packet 51. The protocol-dependent information 52 includes, by way of example, a source address, source port number, destination address, destination port number, and Uniform Resource Locator (URL) for HTTP; a file name and user name for FTP; and a sender identification, recipient identification, and subject for SMTP. Other types of protocol-dependent information could also be stored, as would be recognized by one skilled in the art.

In addition to the protocol-dependent information 52, the actual content of each reassembled packet is stored as data 53. The data 53 is stored in the data format employed by the specific network protocol. Importantly, while each incoming packet is received as part of a transient packet stream, the only portion of the stream that is actually stored as data 53 is the individual upper layer protocol-packets, incorporating encoding as appropriate. Thus, if ordinarily stored as encoded data, the data 53 would need to be decoded prior to scanning by the antivirus scanner 32. For instance, the SMTP, PO3 and NNTP network protocols require MIME decoding prior to antivirus scanning.

Figure 4:
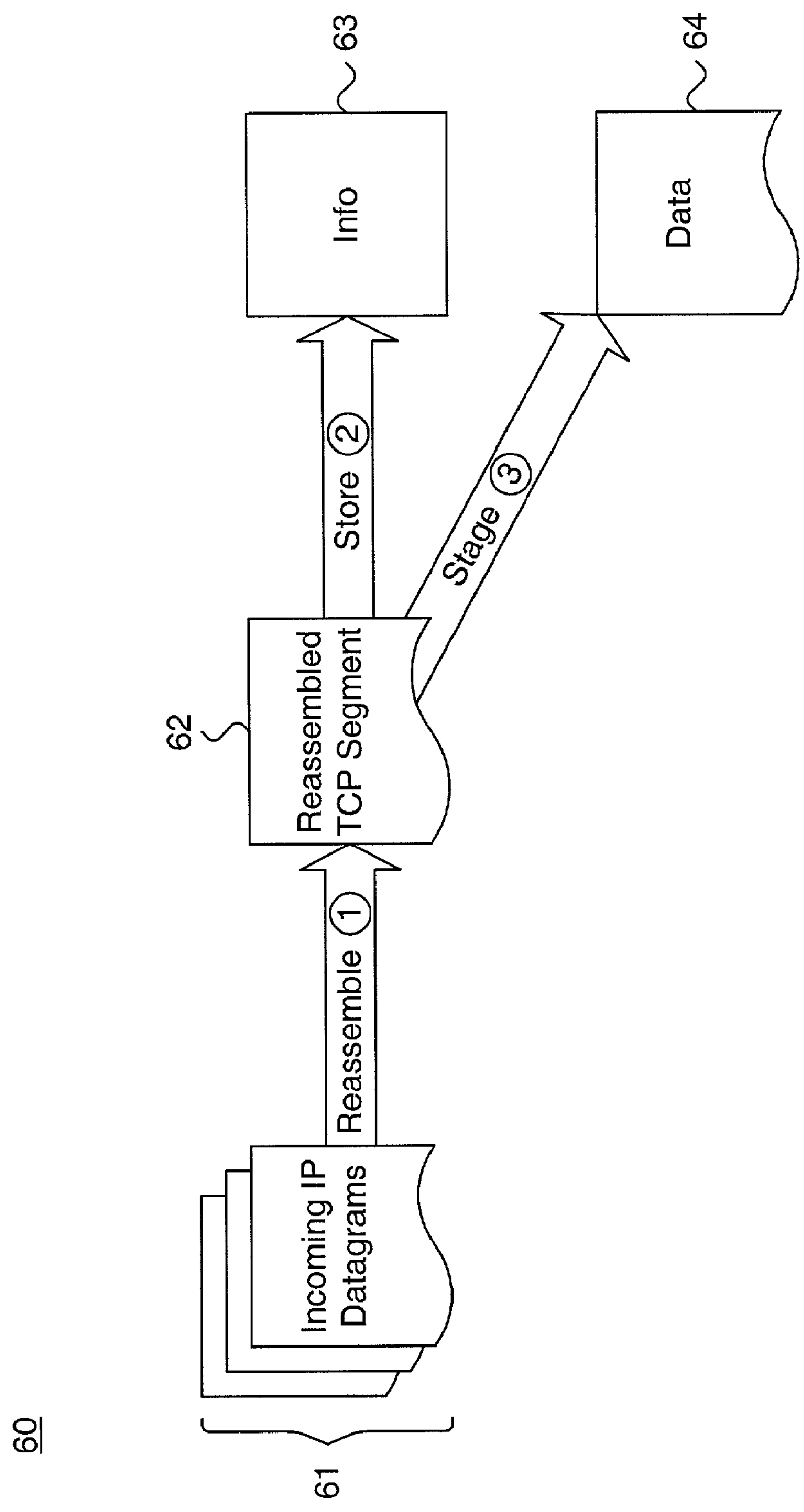
FIG. 4 is a process flow diagram showing the passive screening of a transient message using the antivirus system of FIG. 1.

FIG. 4 is a process flow diagram showing passive screening 60 of a transient message using the antivirus system 21 of FIG. 1. In the described embodiment, incoming IP datagrams 61 are received from the internetwork. One or more of the incoming IP datagrams 61 are reassembled (step ①) into a reassembled TCP segment 62. The reassembled TCP segment 62 is then parsed. Protocol-dependent information 63 stored (step ②) with the reassembled TCP segment 62. In addition, the actual data 64 is staged (step ③) with the reassembled TCP segment 62. The HTTP, FTP, SMTP, POP3, NNTP, and Gnutella protocol formats are supported, although one skilled in the art would recognize that other protocol formats could also be supported.

Figure 5:
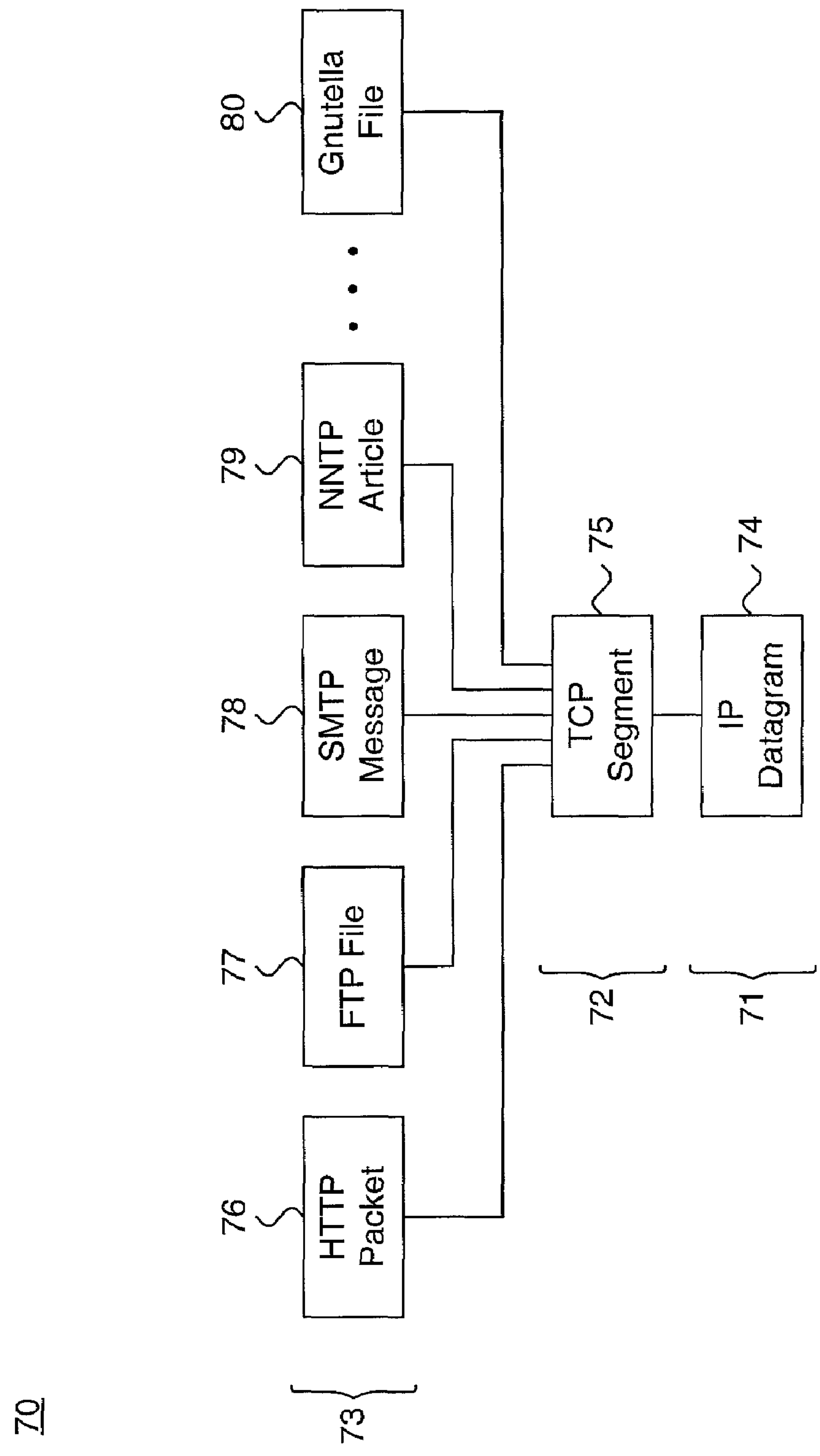
FIG. 5 is a block diagram showing the interrelationships between transient packets processed by the antivirus system of FIG. 1.

FIG. 5 is a block diagram showing the interrelationships 70 between transient packets processed by the antivirus system 21 of FIG. 1. The transient packets are structured in compliance with standard TCP/IP network protocol layers, such as described in W. R. Stephens, *TCP/IP Illustrated*, Vol. 1, "The Protocols," Ch. 1-3, cited above.

Raw network data is copied by the antivirus scanner 21 (shown in FIG. 1) as IP datagrams 74 in a network data layer 71. The IP datagrams 74 are reassembled into TCP segments 75 is a transport protocol layer 72. Finally, the TCP segments 75 are stored as protocol-specific packets, including HTTP packets 76, FTP files 77, SMTP messages 78, NNTP articles 79, and Gnutella files 80, to name a few, in an application protocol layer 73. For simplicity and clarity of presentation, the term packets is used to refer generically to files, messages, articles, datagrams, and packets. The described embodiment performs the necessary antivirus scanning on packets of these types through passive packet screening. Thus, the throughput of message traffic through the network domain boundary remains unaffected by on-going antivirus packet analyses.

Figure 6:
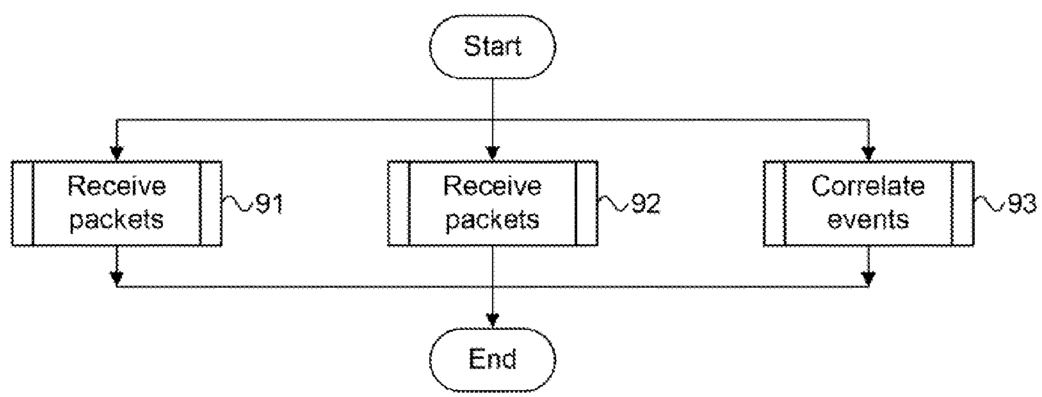
FIG. 6 is a flow diagram showing a method for providing passive screening of transient messages in a distributed computing environment, in accordance with the present invention.

FIG. 6 is a flow diagram showing a method for providing passive screening of transient messages in a distributed computing environment 90, in accordance with the present invention. The method initializes and executes three independent processes for receiving packets (block 91), scanning packets (block 92), and correlating events (block 93), as further described below with reference to FIGS. 7, 9 and 11, respectively. Following completion of the foregoing independent processes (blocks 91-93), the method terminates.

Figure 7:
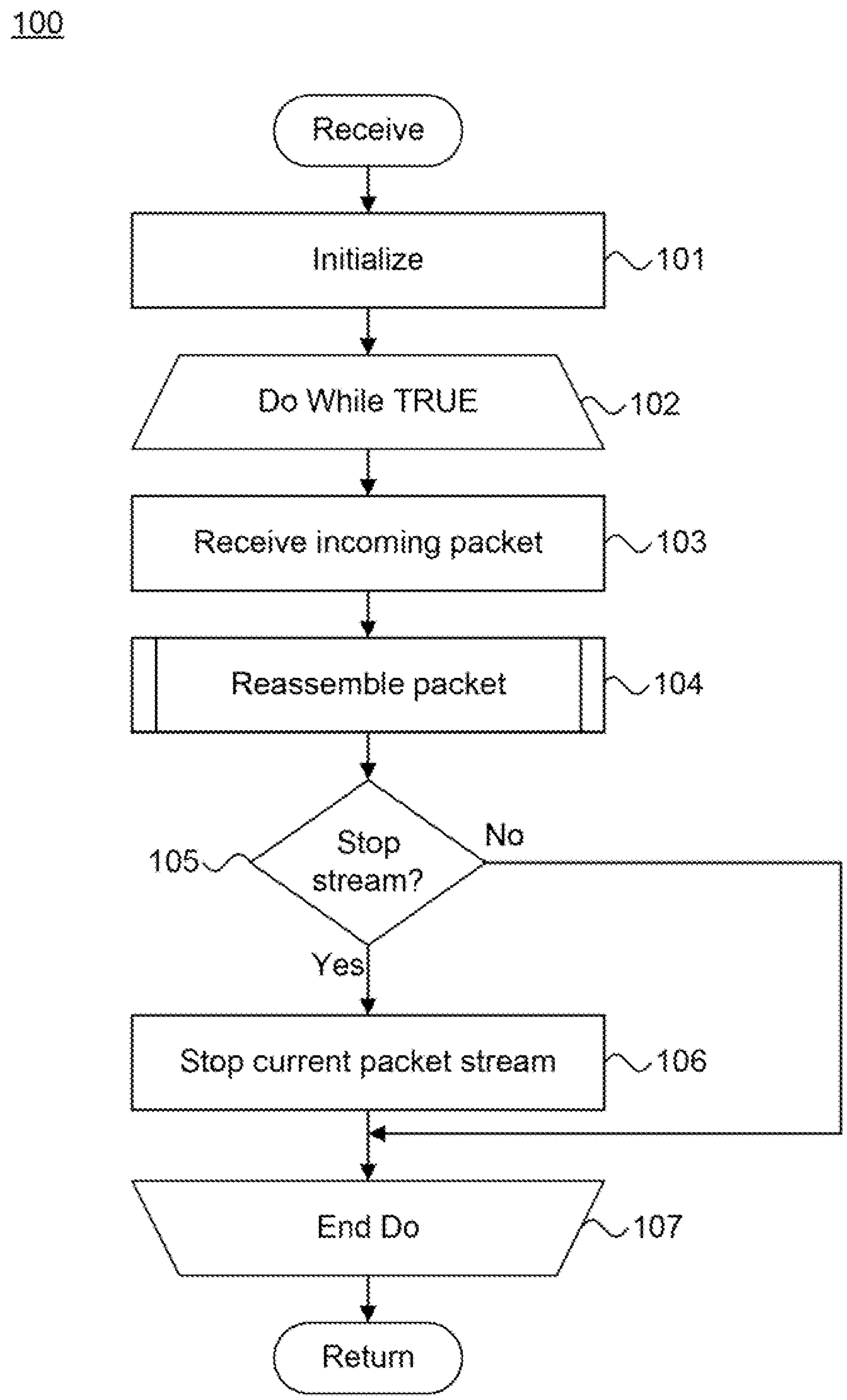
FIG. 7 is a flow diagram showing the routine for receiving a packet for use in the method of FIG. 6.

FIG. 7 is a flow diagram showing the routine for receiving a packet 100 for use in the method 90 of FIG. 6. The purpose of this routine is to receive and parse incoming packets 43 (shown in FIG. 2) from the incoming packet queue 42.

Thus, the routine 100 begins by initializing internal data structures (block 101). Incoming packets 43 are then iteratively processed (blocks 102-107), as follows. Each incoming packet 43 is received from the incoming packet queue 42 (block 103). The incoming packet 43 is then reassembled (block 104), as further described below with reference to FIG. 8. In a further embodiment, the incoming packet stream can be stopped if an infected packet is identified. Thus, upon request (block 105), the current incoming packet stream is stopped (block 106). Processing continues with each incoming packet 42 (block 107), after which the routine returns.

Figure 8:
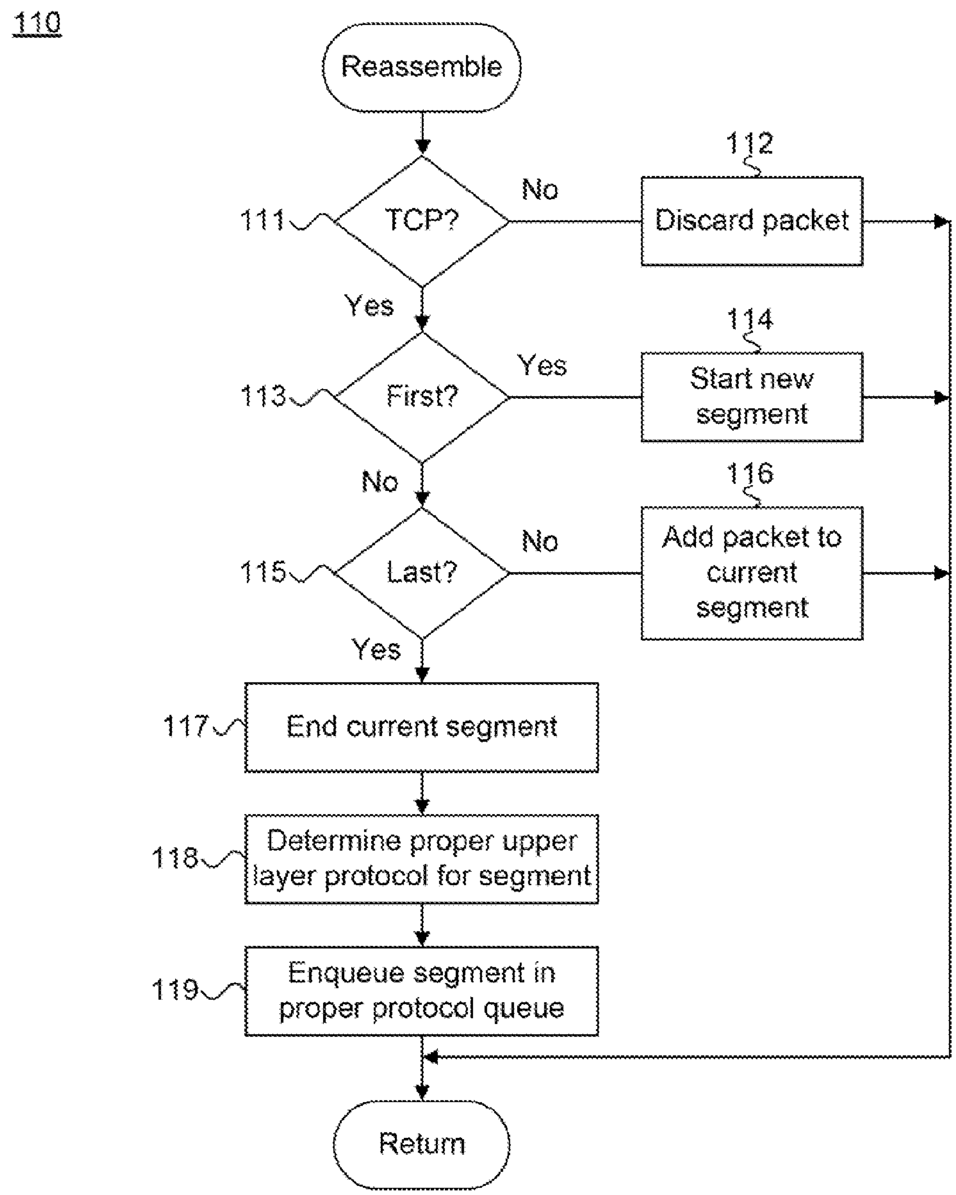
FIG. 8 is a flow diagram showing the routine for reassembling a packet for use in the routine of FIG. 7.

FIG. 8 is a flow diagram showing the routine for reassembling a packet 110 for use in the routine 100 of FIG. 7. The purpose of this routine is to reassemble incoming IP datagrams 74 into TCP segments 75 (shown in FIG. 5). The described embodiment specifically reassembles TCP segments from IP datagrams as the TCP network protocol is widely used by applications executing in the network and application protocol layers.

Thus, if the IP datagram 74 does not contain a TCP segment 75 (block 111), the incoming packet 43 is discarded (block 112). Otherwise, if the IP datagram 74 contains the first part of a TCP segment 75 (block 113), a new TCP segment is started (block 114) by staging the first part in temporary storage. If the IP datagram 74 is not the last part of a TCP segment 75 (block 115), the part is added to the current TCP segment (block 116) in temporary storage. Otherwise, if the IP datagram 74 contains the last part of a TCP segment 75 (block 115), the current TCP segment is ended (block 117) and the appropriate upper layer protocol for the TCP segment 75 is determined (block 118). In the described embodiment, the HTTP, FTP, SMTP, POP3, NNTP, and Gnutella upper layer network protocols are supported. The TCP segment 75 is then enqueued into the proper protocol-specific queue 41 (shown in FIG. 2) (block 119), after which the routine returns.

Figure 9:
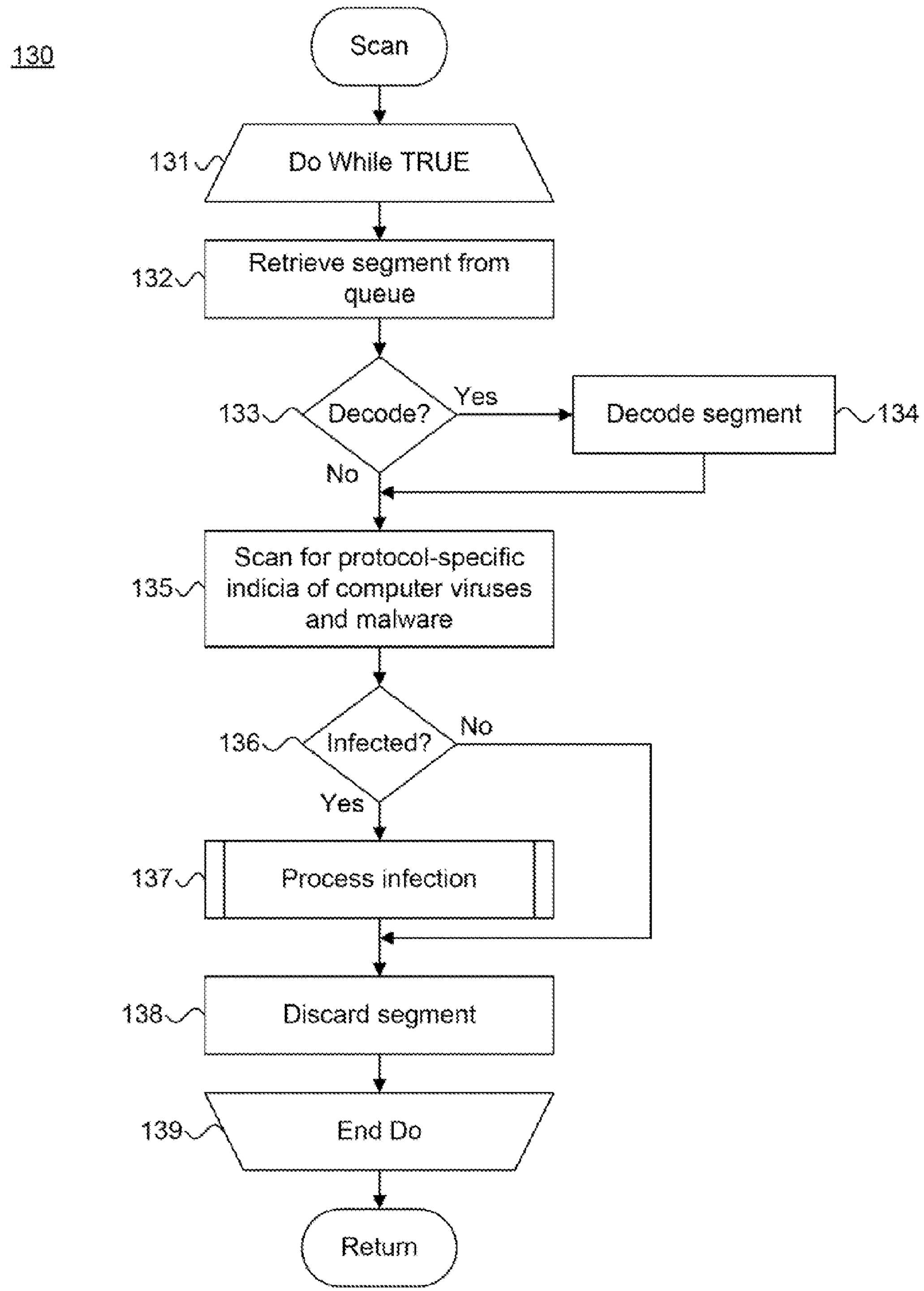
FIG. 9 is a flow diagram showing the routine for scanning a message for use in the method of FIG. 6.

FIG. 9 is a flow diagram showing the routine for scanning a message 130 for use in the method 90 of FIG. 6. The purpose of this routine is to identify protocol-specific indicia of computer viruses and malware in transient upper layer network protocol packets.

Each TCP segment 75 is iteratively processed (blocks 131-139), as follows. First, a TCP segment 75 (shown in FIG. 5) is retrieved from a protocol-specific queue 41 (shown in FIG. 2) (block 132). If necessary (block 133), the TCP segment 75 is decoded (block 134). In the described embodiment, the SMTP, POP3, and NNTP application layer network protocols require MIME decoding.

The packet is then scanned for protocol-specific indicia of computer viruses, malware, and other bad content (block 135), as is known in the art. If the packet is infected (block 136), the infection is processed (block 137), as further described below with reference to FIG. 10. Following scanning and any necessary processing, the TCP segment 75 is discarded (block 138). Processing continues with each remaining TCP segment 75 (block 139), after which the routine returns.

Figure 10:
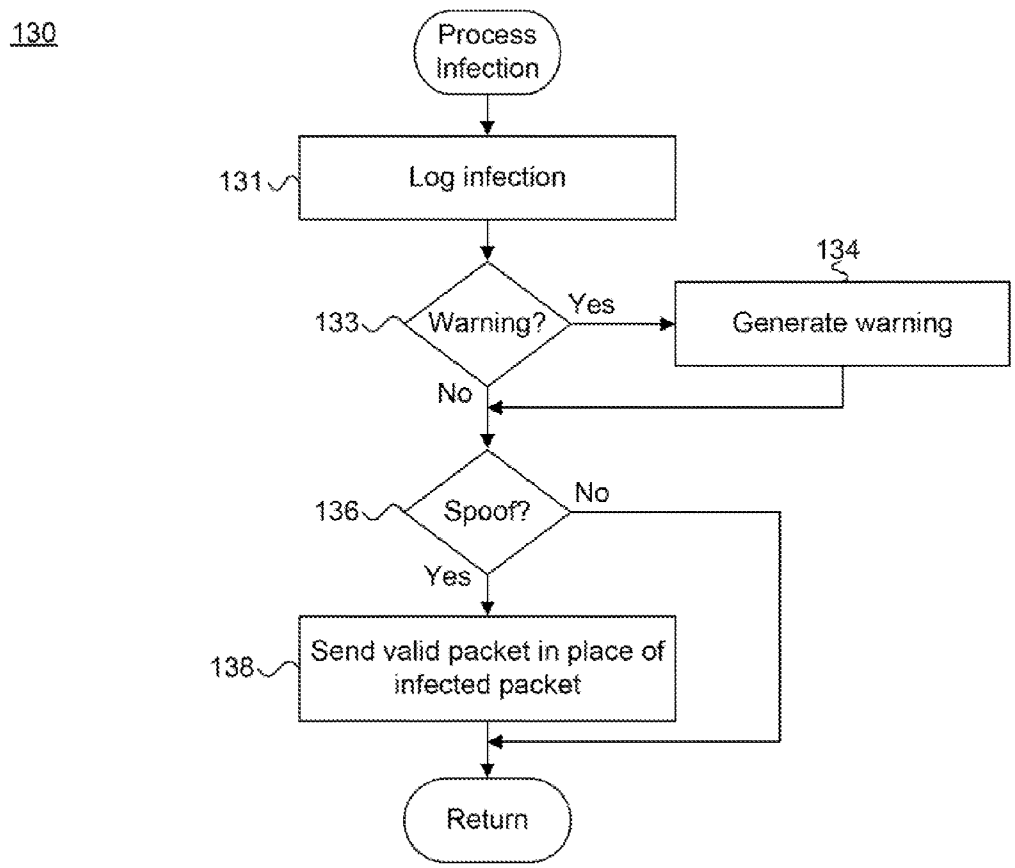
FIG. 10 is a flow diagram showing the routine for processing an infection for use in the routine of FIG. 9.

FIG. 10 is a flow diagram showing the routine for processing an infection 140 for use in the routine 130 of FIG. 9. The purpose of this routine is to perform one or more actions following the detection of a computer virus infection.

Each computer virus infection is logged into a log 47 (shown in FIG. 2) (block 141). If opted (block 142), a warning is generated (block 143) to the network administrator and other appropriate user. As well, if opted (block 144), a valid packet is sent as a spoof of an infected packet (block 145) by way of the outgoing packet queue 48. The routine then returns.

Figure 11:
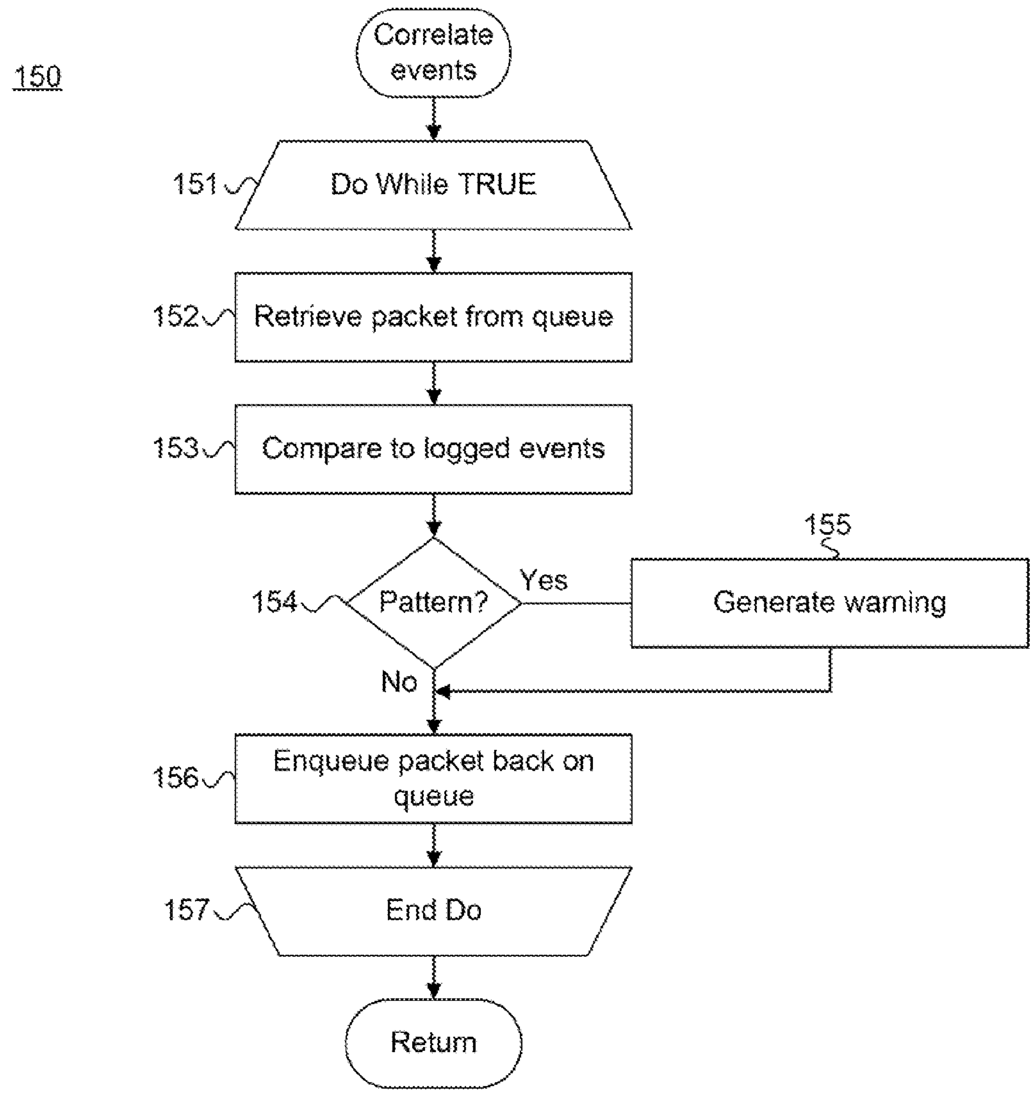
FIG. 11 is a flow diagram showing the routine for correlating events for use in the method of FIG. 6.

FIG. 11 is a flow diagram showing the routine for correlating events 150 for use in the method 90 of FIG. 6. The purpose of this routine is to analyze the incoming packet stream for patterns indicating a denial of service or related network attack.

Each TCP segment 75 (shown in FIG. 5) is retrieved from the protocol-specific queues 41 (shown in FIG. 2) (block 152). The retrieved TCP segment 75 is compared to the existing events 45 stored in the event database 44 (block 153) to detect a pattern indicative of a denial of service or related network attack. If a pattern is detected (block 154), a warning is generated (block 155). The TCP segment 75 is then enqueued back onto the appropriate protocol-specific queue 41 (block 156). Processing continues with each TCP segment 75 in the appropriate protocol-specific queue 41 (block 157), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing passive screening of transient messages in a distributed computing environment, comprising:

a network interface passively monitoring a transient packet stream at a network boundary comprising receiving incoming datagrams structured in compliance with a network protocol layer;

a packet receiver reassembling one or more of the incoming datagrams into a segment structured in compliance with a transport protocol layer;

an antivirus scanner scanning contents of the reassembled segment for a presence of at least one of a computer virus and malware to identify infected message contents;

a protocol-specific module processing each reassembled datagram based on the transport protocol layer employed by the reassembled datagram; and a spoof module sending a spoofed network protocol packet responsive to an occurrence of at least one of an infection and a network attack;

wherein the spoofed network protocol packet spoofs an origin server by being utilized to send a legitimate packet to a network domain in place of an infected packet.

2. A system according to claim 1, further comprising:

an incoming queue staging each incoming datagram intermediate to reassembly.

3. A system according to claim 1, further comprising:

a network protocol-specific decoder decoding the reassembled segment prior to scanning.

4. A system according to claim 1, wherein the antivirus scanner terminates the transient packet stream if the reassembled segment is not infected with at least one of a computer virus and malware.

5. A system according to claim 1, wherein the antivirus scanner takes an action if the reassembled segment is infected with at least one of a computer virus and malware.

6. A system according to claim 5, wherein the action comprises at least one of logging the infection; generating a warning; spoofing a valid datagram in place of the infected datagram; and acquiescing to the infection.

7. A system according to claim 1, further comprising:

a protocol-specific queue staging each reassembled segment with other reassembled segments sharing the same transport protocol layer.

8. A system according to claim 7, further comprising:

an information record storing information dependent on the same transport protocol layer with staged reassembled segment.

9. A system according to claim 8, further comprising:

a contents record storing the contents with the staged reassembled segment.

10. A system according to claim 8, wherein the information comprises at least one of a source address, source port number, destination address, destination port number, URL, file name, user name, sender identification, recipient identification, and subject.

11. A system according to claim 1, further comprising;

an event correlator analyzing the transient packet stream for events indicative of a network service attack.

12. A system according to claim 11, further comprising:

a data repository maintaining each event.

13. A system according to claim 1, wherein the distributed computing environment is TCP/IP-compliant and each incoming message is SMTP-compliant.

14. A system according to claim 1, wherein the incoming datagrams include IP datagrams that are reassembled into TCP segments.

15. A method for providing passive screening of transient messages in a distributed computing environment, comprising:

passively monitoring a transient packet stream at a network boundary comprising receiving incoming datagrams structured in compliance with a network protocol layer;

reassembling one or more of the incoming datagrams into a segment structured in compliance with a transport protocol layer;

scanning contents of the reassembled segment for a presence of at least one of a computer virus and malware to identify infected message contents;

processing each reassembled datagram based on the transport protocol layer employed by the reassembled datagram; and sending a spoofed network protocol packet responsive to an occurrence of at least one of an infection and a network attack;

wherein the spoofed network protocol packet spoofs an origin server by being utilized to send a legitimate packet to a network domain in place of an infected packet.

16. A method according to claim 15, further comprising:

staging each incoming datagram intermediate to reassembly.

17. A method according to claim 15, further comprising:

decoding the reassembled segment prior to scanning.

18. A method according to claim 15, further comprising:

terminating the transient packet stream if the reassembled segment is not infected with at least one of a computer virus and malware.

19. A method according to claim 15, further comprising:

taking an action if the reassembled segment is infected with at least one of a computer virus and malware.

20. A method according to claim 19, further comprising:

executing the action, comprising at least one of:

logging the infection;

generating a warning;

spoofing a valid datagram in place of the infected datagram; and acquiescing to the infection.

21. A method according to claim 15, further comprising:

staging each reassembled segment with other reassembled segments sharing the same transport protocol layer.

22. A method according to claim 21, further comprising:

storing information dependent on the same transport protocol layer with the staged reassembled segment.

23. A method according to claim 22, further comprising:

storing the contents with the staged reassembled segment.

24. A method according to claim 22, wherein the information comprises at least one of a source address, source port number, destination address, destination port number, URL, file name, user name, sender identification, recipient identification, and subject.

25. A method according to claim 15, further comprising:

analyzing the transient packet stream for events indicative of a network service attack.

26. A method according to claim 25, further comprising:

maintaining each event in a data repository.

27. A method according to claim 15, wherein the distributed computing environment is TCP/IP-compliant and each incoming message is SMTP-compliant.

28. A computer-readable storage medium holding code for performing the method according to claims 15, 16, 17, 18, 19, 20, 21, 22, 23, 24, 25, 26, or 27.

29. A system for passively detecting computer viruses and malware and denial of service-type network attacks in a distributed computing environment, comprising:

a network interface receiving copies of datagrams transiting a boundary of a network domain into an incoming packet queue, each datagram being copied from a packet stream;

a packet receiver reassembling one or more such datagrams from the incoming packet queue into network protocol packets, each staged in a reassembled packet queue;

an antivirus scanner scanning each network protocol packet from the reassembled packet queue to ascertain an infection of at least one of a computer virus and malware;

an event correlator evaluating events identified from the datagrams in the packet stream to detect a denial of service-type network attack on the network domain; and a spoof module sending a spoofed network protocol packet responsive to an occurrence of at least one of the infection and the network attack;

wherein a protocol-specific module processes each reassembled datagram based on an upper protocol layer employed by the reassembled datagram;

wherein the spoofed network protocol packet spoofs an origin server by being utilized to send a legitimate packet to the network domain in place of an infected packet.

30. A system according to claim 29 further comprising:

a parser parsing each reassembled datagram into network protocol-specific information and packet content.

31. A system according to claim 30, wherein the network protocol-specific information comprises a source address, source port number, destination address, destination port number, and URL for HTTP; a file name and user name for FTP; and a sender identification, recipient identification, and subject for SMTP.

32. A system according to claim 30, further comprising:

a decoder decoding the packet content prior to performing the operation of scanning.

33. A system according to claim 29, further comprising:

a log logging an occurrence of at least one of the infection and the network attack.

34. A system according to claim 29, further comprising:

a warning module generating a warning responsive to an occurrence of at least one of the infection and the network attack.

35. A system according to claim 29, wherein the distributed computing environment is TCP/IP-compliant, each datagram is IP-compliant, and each network protocol packet is TCP-compliant.

36. A system according to claim 29, wherein the network protocol packets employ at least one of HTTP, FTP, SMTP, POP3, NNTP, and Gnutella network protocols.

37. A system according to claim 29, wherein only datagrams compliant with IP protocol are reassembled.

38. A system according to claim 29, wherein the antivirus scanner includes a plurality of protocol-specific scanning submodules, each protocol-specific scanning submodule designated for scanning network protocol packets of a particular protocol.

39. A system according to claim 38, wherein the protocol-specific scanning submodules include an HTTP submodule, an FTP submodule, an SMTP submodule, and an NNTP submodule.

40. A system according to claim 38, wherein each of the protocol-specific scanning submodules is used for retrieving a re-assembled packet from an associated protocol-specific queue.

41. A system according to claim 40, wherein the packet receiver maintains each protocol-specific queue at a constant size in accordance with the antivirus scanner.

42. A method for passively detecting computer viruses and malware and denial of service-type network attacks in a distributed computing environment, comprising:

receiving copies of datagrams transiting a boundary of a network domain into an incoming packet queue, each datagram being copied from a packet stream;

reassembling one or more such datagrams from the incoming packet queue into network protocol packets, each staged in a reassembled packet queue;

scanning each network protocol packet form the reassembled packet queue to ascertain an infection of at least one of a computer virus and malware;

evaluating events identified from the datagrams in the packet stream to detect a denial of service-type network attack on the network domain; and sending a spoofed network protocol packet responsive to an occurrence of at least one of the infection and the network attack;

wherein a protocol-specific module processes each reassembled datagram based on an upper protocol layer employed by the reassembled datagram;

wherein the spoofed network protocol packet spoofs an origin server by being utilized to send a legitimate packet to the network domain in place of an infected packet.

43. A method according to claim 42, further comprising:

parsing each reassembled datagram into network protocol-specific information and packet content.

44. A method according to claim 43, wherein the network protocol-specific information comprises a source address, source port number, destination address, destination port number, and URL for HTTP; a file name and user name for FTP; and a sender identification, recipient identification, and subject for SMTP.

45. A method according to claim 43, further comprising:

decoding the packet content prior to performing the operation of scanning.

46. A method according to claim 42 further comprising:

logging an occurrence of at least one of the infection and the network attack.

47. A method according to claim 42, further comprising:

generating a warning responsive to an occurrence of at least one of the infection and the network attack.

48. A method according to claim 42, wherein the distributed computing environment is TCP/IP-compliant, each datagram is IP-compliant, and each network protocol packet is TCP-compliant.

49. A computer-readable storage medium holding code for performing the method according to claims 42, 43, 44, 45, 46, 47, or 48.

* * * * *

UNITED STATES PATENT AND TRADEMARK OFFICE

CERTIFICATE OF CORRECTION

PATENT NO. : 7,461,403 B1
APPLICATION NO. : 10/061415
DATED : December 2, 2008
INVENTOR(S) : Libenzi et al.

It is certified that error appears in the above-identified patent and that said Letters Patent is hereby corrected as shown below:

In the claims:
col. 9, line 9 insert --the-- before “staged” and after “with”;
col. 9, line 19 replace “comprising;” with --comprising:--;
col. 12, line 1 replace “form” with --from--.

Signed and Sealed this

Sixteenth Day of February, 2010

David J. Kappos
*Director of the United States Patent and Trademark Office*